Figure 1:
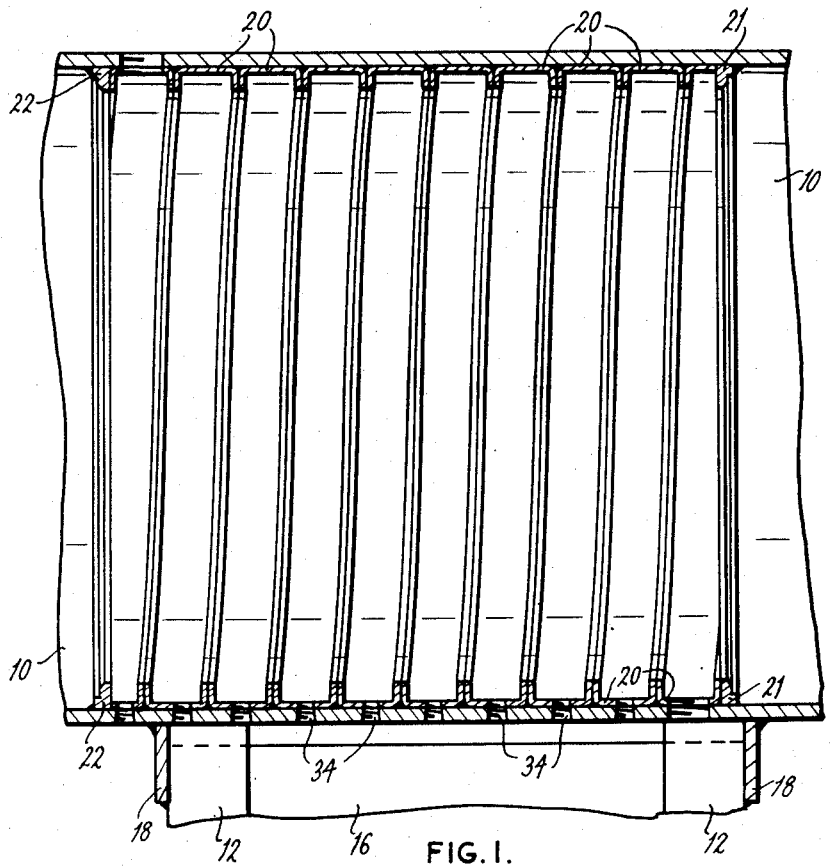

April 22, 1958 L. H. HIRSCH 2,831,662
FLUID COOLED DYNAMO ELECTRIC MACHINE
Filed Sept. 14, 1953 2 Sheets-Sheet 1

Louis N. Hirsch
INVENTOR.

BY

Rey Eilers
ATTORNEY

April 22, 1958 L. H. HIRSCH 2,831,662
FLUID COOLED DYNAMO ELECTRIC MACHINE
Filed Sept. 14, 1953 2 Sheets-Sheet 2

Louis H. Hirsch
INVENTOR.

BY

Rey Eilers
ATTORNEY

United States Patent Office 2,831,662
Patented Apr. 22, 1958

2,831,662

FLUID COOLED DYNAMO ELECTRIC MACHINE

Louis H. Hirsch, St. Louis, Mo., assignor to Century Electric Company, St. Louis, Mo., a corporation of Missouri Application September 14, 1953, Serial No. 379,960

1 Claim. (Cl. 257—250)

This invention relates to improvements in dynamo electric machines. More particularly this invention relates to improvements in fluid-cooled dynamo electric machines.

It is therefore an object of the present invention to provide an improved fluid-cooled dynamo electric machine.

It is desirable, in the manufacture of dynamo electric machines, to make those machines as small as possible. The smaller the dynamo electric machine can be made, the less the cost of the materials going into that machine, and the smaller amount of space that machine will occupy during shipment and storing. While it is desirable to make dynamo electric machines as small as possible, those machines must still be kept relatively cool to keep those machines from becoming overheated. However, the smaller the dynamo electric machines are, the more difficult it is to cool them adequately.

It has been suggested that dynamo electric machines can be cooled adequately by increasing the size of the fans used with those machines. However, the smaller the dynamo electric machines are, the less space there is available for the fans. Moreover, the heat transferring capacity of air is limited. For these reasons, the provision of fans to pass air through dynamo electric machines to cool those machines can be objectionable.

It has also been proposed to pass liquids through dynamo electric machines to absorb heat from those machines and keep the overall temperature rise of those machines within safe limits. A number of such dynamo electric machines have been proposed, but the problem of maintaining a liquid tight connection between the various parts of the dynamo electric machines is serious; and yet such liquid tight connections must be maintained to protect the electrical parts of those machines from contact with the liquid. In addition, the liquid-cooling of the dynamo electric machines must be both effective and inexpensive, and must not unduly increase the size of the dynamo electric machines. The present invention provides such a method of cooling the dynamo electric machines with liquid; and it is therefore an object of the present invention to provide an effective but inexpensive method of cooling dynamo electric machines with liquid.

The present invention provides a formed strip that is wound in helical configuration about a shell which supports the stator of the dynamo electric machine. This formed strip has a base portion and an upstanding wall portion; and the base portion and upstanding wall portion of the strip coact with the shell for the stator to define a number of turns of a helical passageway for liquid. The various turns of the strip are intimately secured together to provide a liquid tight seal and thus leakage of liquid is minimized or prevented. The formed strip can readily be made to assume a helical configuration, and the adjacent turns of that strip can readily be joined together in intimate relation by welding or other means. The formed strip thus provides the desired liquid-tight passageway for cooling liquid in an inexpensive but effective manner. It is therefore an object of the present invention to provide a formed strip which has a base portion and an upstanding wall portion and which can be formed about the shell for the stator of a dynamo electric machine in helical configuration and that can have the adjacent turns thereof intimately associated together to form a helical passageway for cooling liquid.

The formed strip provided by the present invention is preferably mounted inside of the outer shell of the dynamo electric machine and then has the shell which supports the stator telescoped within that formed strip. Prior to the time that the shell for the stator is telescoped within the formed strip, the free edges of the wall portions of that formed strip can be machined to define a cylindrical surface which will receive the shell for the stator. In this way, a closer and tighter fit can be provided between the formed strip and the shell for the stator; and thus a more liquid-tight construction attained. It is therefore an object of the present invention to provide a formed strip and to mount that formed strip in the outer shell of a dynamo electric machine and to machine the free edges of the wall portions of that strip before the shell that carries the stator is inserted within the outer shell of the dynamo electric machine.

The formed strip provided by the present invention is preferably a channel. Such a formed strip has a base portion that can be secured to the inner surface of the outer shell of the dynamo electric machine and has two upstanding wall portions that can be used to largely define the helical passageway for the cooling liquid. The wall portions of the adjacent turns of the formed strip can be welded or otherwise secured together and each turn of the formed strip will itself provide three water tight sides of the passageway for the cooling liquid. The only place where leakage could occur would be between adjacent turns of the formed strip or between the free edges of the upstanding wall portions of that strip and the exterior of the shell for the stator. However, the cooling liquid will be passing through the helical passageways with some speed and therefore will have a somewhat lesser pressure exerted on it adjacent the shell for the stator than it has adjacent the base portion of the formed strip. Consequently, the formed strip provides the greatest resistance to leakage at the point where the pressure on the cooling liquid is the greatest. As a result, the liquid-cooled dynamo electric machine provided by the present invention is strongly resistant to leakage. It is therefore an object of the present invention to provide a formed strip for a liquid-cooled dynamo electric machine which is a channel.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claim.

Figure 2:
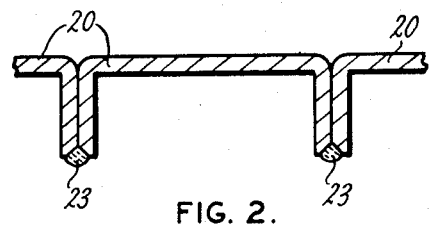
Figure 3:
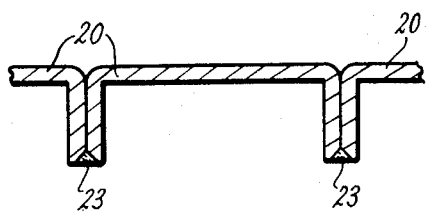
Figure 4:
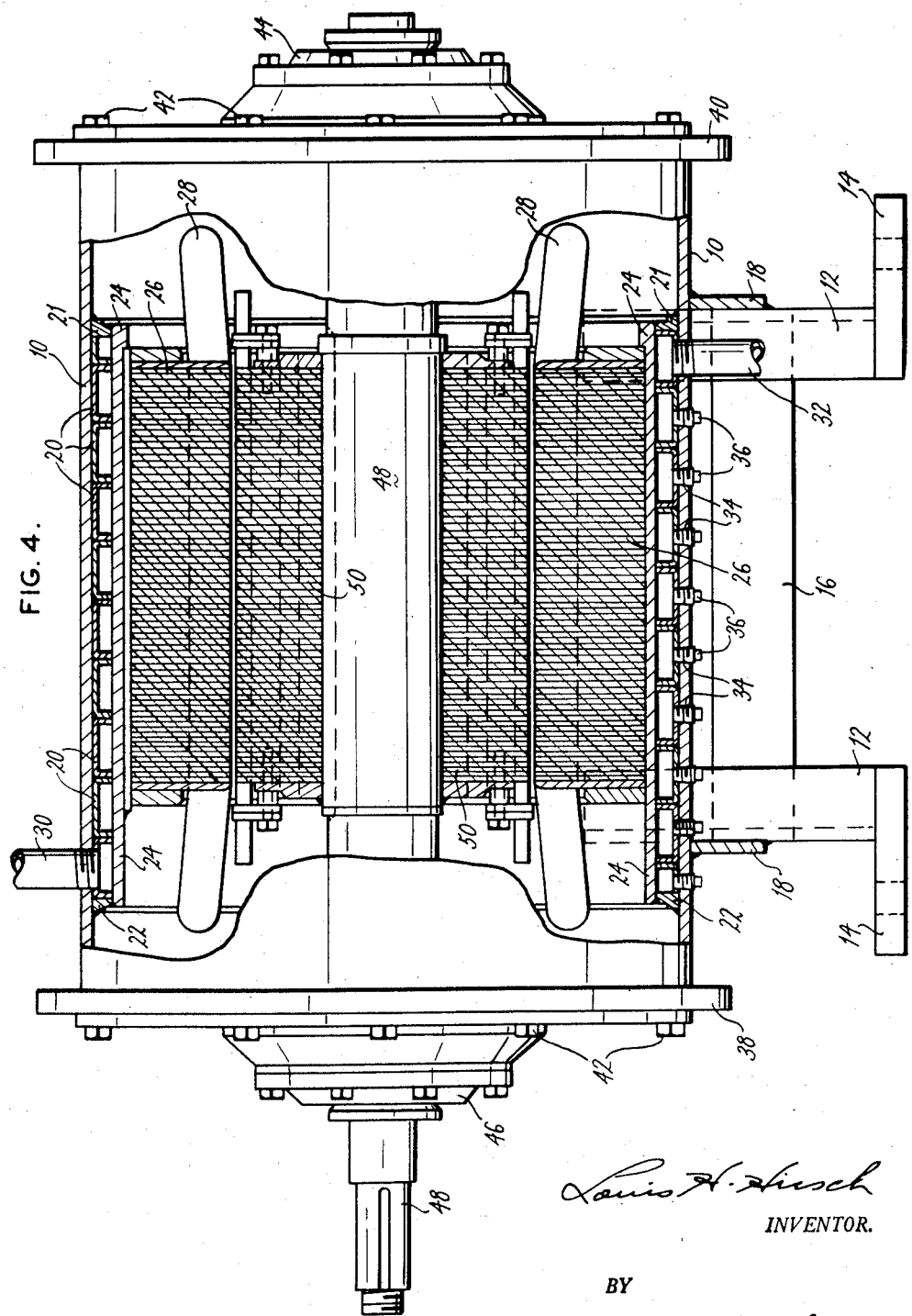

In the drawing,

Fig. 1 is a cross sectional side view of the outer shell of a dynamo electric machine that is made in accordance with the principles and teachings of the present invention, Fig. 2 is a cross sectional view on an enlarged scale of the formed strip for the shell of Fig. 1, and it shows that formed strip after it has been welded, Fig. 3 is a view of the formed strip of Fig. 2 after a part of the weld has been cut away, and Fig. 4 is a partially sectioned elevational view of a liquid-cooled dynamo electric machine that is made in accordance with the principles and teachings of the present invention.

Referring to the drawing in detail, the numeral 10 denotes the outer shell of a dynamo electric machine. This shell is equipped with downwardly extending legs 12, and each of those legs is provided with outwardly extending feet 14. The legs 12 are preferably welded to the exterior of the shell 10, and the feet 14 are preferably welded to the legs 12. If desired, the legs 12 and the feet 14 can be suitably secured to each other and to the shell 10 by bolts or rivets.

Axially-extending reinforcing plates 16 are secured to the legs 12 of the motor provided by the present invention. Two such plates 16 will be provided, but one of the plates is obscured by the other in Fig. 4. Transversely extending reinforcing plates 18 are secured to the ends of the legs 12 and to the exterior of the shell 10. The axially-extending plates 16 and the transversely-extending plates 18 coact with the legs 12 to form a rigid and sturdy support for the motor.

A formed strip 20, preferably of U-shaped cross section is wound into the interior of the shell 10. The leading end of the formed strip 20 will taper to a point and that leading end will abut an annular plate 22 which is carried by the shell 10 and which extends radially inwardly from that shell. That plate is shown adjacent the left hand end of the shell 10 in Figs. 1 and 4; and it is shown as being welded to the inner surface of the shell 10. The tapered edge of the strip 20 will coact with the annular plate 22 to define a liquid-tight joint; and if desired, that joint can be made further liquid-tight by a continuous weld along it. The formed strip 20 will be bent so it forms a series of turns of helical configuration, and so the adjacent turns immediately abut each other. The trailing end of the strip 20 is also cut on a taper; and that tapered end will abut an annular plate 21 adjacent the right hand end of the shell 10. The trailing end of the formed strip 20 will coact with the annular plate 21 to form a liquid-tight junction; and if desired, that junction can be made further liquid-tight by a continuous weld that extends along it. The taper on the leading end and trailing end of the formed strip 20 will be such that when the formed strip is disposed in helical configuration within the shell 10, the edges of the leading and trailing ends will be lying in planes that are precisely perpendicular to the axis of the shell 10.

The strip 20 has a base portion and two upstanding wall portions, and the base portion will abut against the inner surface of the shell 10. The upstanding wall portions of the strip 20 will abut each other. The engagement between the upstanding wall portions of adjacent turns of the strip 20 will be so intimate that a liquid-tight joint will be formed therebetween; but to make the joint absolutely liquid-tight, a continuous weld 23 is formed along that joint. The formation of the weld will cause part of the metal of the upstanding wall portions to flow together with the metal of the adjacent wall portions and thus a merging of the two wall portions will occur adjacent the free edges of those portions. During the formation of the weld 23, the free edges of the wall portions of the formed strip 20 will be built up slightly, but those free edges will be machined to define a cylindrical surface, as indicated particularly in Fig. 3. After the machining operation, the free edges of the upstanding wall portions of the strip 20 will still be intimately welded together and the liquid-tightness of the joint will still be preserved.

The machining of the free edges of the upstanding wall portions of the strip 20 will enable the strip 20 to receive and intimately engage the shell 24 that carries the stator 26 of the dynamo electric machine. The machining of the free edges of the formed strip 20 can be such that the shell 24 must be pressed into the shell 10, or it can be inserted in the shell 10 through a "sweating" process. In either event, the engagement between the free edges of the formed strip 20 and the exterior of the shell 24 will be intimate and will be substantially liquid-tight. Once the shell 24 which carries the stator 26 is disposed within the hell 10, a continuous liquid-tight weld is formed between the inner peripheries of the annular plates 21 and 22 and the outer ends of the shell 24. Previously, a continuous liquid-tight weld was formed between the outer peripheries of the annular plates 21 and 22 and the inner periphery of the shell 10. As a result, the annular plates 21 and 22 coact with the shells 10 and 24 and with the two sets of liquid-tight welds to define an absolutely liquid-tight annular space. This liquid-tight space is subdivided into a helical passage for liquid by the formed strip 20, and each adjacent turn of the passage is substantially isolated from the other turns of that passage. The three outer edges of each turn of the passage are completely isolated from each other turn of the passage because those three outer edges are integral parts of the U-shaped formed strip; and that formed strip is impervious to liquid. While the inner edge of each turn of the passage is not an integral part of the formed strip 20, that inner surface is a part of the shell 24 and the engagement between the free edges of the various turns of the passage and the exterior of the shell 24 is substantially liquid-tight. Consequently, each turn of the passage is substantially isolated from each other turn of that passage.

If there is a slight gap between any part of the free edge of the formed strip 20 and the exterior of the shell 24, that gap will be very small. Moreover, such a gap will not permit liquid to leak out of the dynamo electric machine because the annular plates 21 and 22 coact with the shells 10 and 24 and with the sets of liquid-tight seals to positively confine any liquid in the passageway. The only leakage could be between adjacent turns of the helical passageway, and that leakage will be small since the large cross-sectional area of the passageway offers far less resistance to the flow of the liquid than does a small gap. In addition, the liquid will be moving through the turns of the passageway with considerable speed and thus will develop appreciable centrifugal forces within it. These centrifugal forces will increase the pressure on the various particles of liquid adjacent the base portion of the strip 20 but will leave the particles of liquid adjacent the shell 24 under lesser pressures. As a result, the forces tending to cause the liquid to leak between adjacent turns of the passage will be greatest where the resistance to leakage is greatest and will be least where the resistance to leakage is least.

A liquid introduced into the passageway defined by the formed strip 20 and the shell 24 and the annular plates 21 and 22 will follow the turns of the passageway without appreciable leakage. Any leakage that does occur will be helpful since it will facilitate the removal of heat from the portion of the shell 24 which is adjacent the gap through which the leakage ocurs. As a result, there will be very little leakage between adjacent turns of the passageway, but any leakage that should occur will additionally help cool the dynamo electric machine.

The stator 26 is provided with windings 28 of suitable design and operation. These windings will be suitably connected to leads extending outwardly from the dynamo electric machine. In the construction shown in the drawing, the dynamo electric machine is a motor, and the windings 28 will thus be connected to a suitable source of power.

A pipe 30 is threaded into the shell 10 and into the end turn of the formed strip 20. This pipe will have a liquid-tight connection with the shell 10 and with the end turn of the formed strip 20, and it will introduce cooling liquid into the helical passageway of the dynamo electric machine. Similarly, a pipe 32 will have one end thereof threaded and will have that end extending into threaded openings in the shell 10 and in the other end turn of the formed strip 20. Again, the connection between the outlet pipe 32 and the shell 10 and the other end turn of the formed strip 20 will be liquid-tight. The cooling liquid will enter at the pipe 30 and will pass through the various turns of the formed strip 20 and will then pass out through the pipe 32. Where desired, water from a suitable tap can be passed through the turns of the helical passageway, or other liquids from suitable reservoirs can be used. In any event, the temperature of the liquid that enters at 30 should be low enough to assure full absorption of heat from the shell 24. That shell is intimately associated with the stator 26 and will rapidly transfer heat from that stator to the liquid passing through the helical passageway.

A number of drain openings 34 are provided in the shell 10, and those openings extend through the various turns of the formed strip 20. These drain openings will normally be closed and made liquid-tight by drain plugs 36. As a result, the drain plugs 36 normally coact with the shells 10 and 24, the formed strip 20, the annular plates 21 and 22, and the two sets of annular welds to keep the dynamo electric machine liquid-tight. Where, however, it is desirable to drain and flush the helical passageway, the drain plugs 36 can be removed and each turn of the passageway suitably drained and flushed out.

An end bell 38 is provided for the left hand end of the shell 10 and an end bell 40 is provided for the right hand end of that shell. Cap screws 42 are used to secure the end balls 38 and 40 to the shell 10.

A bearing housing 44 is provided on the end bell 40, and that bearing housing supports a bearing which receives the right hand end of the shaft 48 of the dynamo electric machine provided by the present invention. The left hand end of the shaft 48 is supported by a bearing in the bearing housing 46 on the end bell 38. The shaft 48 carries a rotor 50 for the dynamo electric machine and that rotor fits within the stator 26.

The stator 26, the windings 28 for the stator 26, the end bells 38 and 40, the cap screws 42, the bearing housings 44 and 46, the shaft 48, and the rotor 50 are of conventional design and construction.

The preferred configuration of the formed strip provided by the present invention is that of a U-shaped channel. However, formed strips which are not themselves U-shaped channels can be made to closely simulate U-shaped channels. For example, an L-shaped formed strip will simulate a helically formed strip that is of U-shaped configuration; the free edges of the base portions of the L-shaped strip abutting the other edges of those base portions to provide a continuous cylindrical surface, and the one upstanding wall portion of the L-shaped strip being the equivalent of the abutting and welded wall portions of the channel-shaped formed strip. Similarly, a T-shaped formed strip could be bent in helical configuration and the free edges of each turn of that strip welded to the free edges of adjacent turns of that strip. The base portions of the T-shaped strip would define a cylindrical wall, and the upstanding wall portions of the T-shaped strip would be the equivalent of the abutting and welded wall portions of the channel-shaped strip.

The formed strips or members can be hot rolled, cold rolled, or extruded. In any event, they must have the malleability to be bent into helical configuration while still maintaining their liquid-tight nature.

The formed member is preferably wound within the outer shell of the dynamo electric machine. In some instances, where desired, the formed member can be wound on a mandrel and then have the adjacent turns thereof welded together to form directly the outer shell of the dynamo electric machine. Such a construction further decreases the overall diameter of the dynamo electric machine and reduces the amount of metal that must be cooled.

Whereas a preferred embodiment of the present invention has been shown and described in the drawing and accompanying description, it should be apparent to those skilled in the art that various changes may be made in the form of the invention without affecting the scope thereof.

What I claim is:

A heat exchanger for a liquid-cooled dynamo electric machine that comprises a housing with a generally cylindrical recess, a formed member that is U-shaped in cross section and that has a base portion and wall portions, said formed member being disposed in said recess to form a helix, said formed member having the said base portion thereof abutting that surface of the said housing which defines said recess, said wall portions extending inwardly from said base portion toward the axis of said helix, said formed member having the adjacent turns thereof immediately adjacent each other, said formed member having the free edges of said wall portions thereof machined to define a cylindrical surface, a cylindrical mass of metal that telescopes within said recess to be supported by said free edges of said wall portions of said formed member, said formed member spanning the distance between and engaging said cylindrical mass and said housing, said cylindrical mass co-acting with said formed member to define a smooth walled helical passage that is liquid-tight adjacent said base of said formed member and is substantially liquid-tight adjacent said free edge of said wall portion of said formed member, an inlet for said passage, an outlet for said passage, and end plates of annular form, said formed member having the endmost turns thereof tapered, said endmost turns abutting and being welded to said annular end plates, said annular end plates extending between said housing and said cylindrical mass.

References Cited in the file of this patent

UNITED STATES PATENTS

| | | |
|---|---|---|
| 963,675 | Willman | July 5, 1910 |
| 1,288,330 | White | Dec. 17, 1918 |
| 1,294,465 | Horvath | Feb. 18, 1919 |
| 1,601,531 | Jeannin | Sept. 28, 1926 |
| 2,320,531 | Mojonnier | June 1, 1943 |
| 2,356,778 | Morrison | Aug. 29, 1944 |
| 2,449,343 | Torbensen | Sept. 14, 1948 |
| 2,504,465 | Sticelber | Apr. 18, 1950 |
| 2,611,798 | Hayes | Sept. 23, 1952 |

FOREIGN PATENTS

| | | |
|---|---|---|
| 463,265 | France | Dec. 12, 1913 |
| 484,953 | Great Britain | May 12, 1938 |
| 872,091 | Germany | Mar. 30, 1953 |